(12) United States Patent
Philipson

(10) Patent No.: US 7,296,643 B2
(45) Date of Patent: Nov. 20, 2007

(54) DRIVE UNIT, AND A POWERED VEHICLE

(75) Inventor: Niklas Philipson, Stockholm (SE)

(73) Assignee: Visual Act Scandinavia AB, Saltsjo-Boo (SE)

( * ) Notice: Subject to any disclaimer, the term of this patent is extended or adjusted under 35 U.S.C. 154(b) by 182 days.

(21) Appl. No.: 10/501,993

(22) PCT Filed: Jan. 22, 2003

(86) PCT No.: PCT/SE03/00109

§ 371 (c)(1),
(2), (4) Date: Nov. 23, 2004

(87) PCT Pub. No.: WO03/062007

PCT Pub. Date: Jul. 31, 2003

(65) Prior Publication Data

US 2005/0061560 A1    Mar. 24, 2005

(30) Foreign Application Priority Data

Jan. 22, 2002    (SE)    .................................... 0200201

(51) Int. Cl.
*B60K 1/02*    (2006.01)
(52) U.S. Cl. .................... 180/65.1; 280/6.58; 280/21
(58) Field of Classification Search ................ 180/167, 180/62, 6.58, 65.1, 21, 22, 23, 908
See application file for complete search history.

(56) References Cited

U.S. PATENT DOCUMENTS

| | | | |
|---|---|---|---|
| 3,404,746 A | 10/1968 | Slay | |
| 3,912,037 A | 10/1975 | Krieg | |
| 4,044,853 A | 8/1977 | Melke | |
| 4,221,273 A * | 9/1980 | Finden | 180/6.48 |
| 4,463,821 A * | 8/1984 | Falamak | 180/168 |
| 4,529,052 A * | 7/1985 | Imai et al. | 180/6.48 |
| 4,533,998 A * | 8/1985 | Falamak | 701/50 |
| 4,733,737 A * | 3/1988 | Falamak | 180/7.1 |
| 5,379,842 A * | 1/1995 | Terry | 180/21 |
| 5,432,416 A | 7/1995 | Tae-Sig | |
| 5,456,332 A | 10/1995 | Borenstein | |
| 5,823,884 A * | 10/1998 | Ager | 472/77 |
| 5,924,512 A | 7/1999 | Wada | |
| 6,948,576 B2 * | 9/2005 | Angeles | 180/23 |

* cited by examiner

Primary Examiner—Christopher P. Ellis
Assistant Examiner—Brian Swenson
(74) Attorney, Agent, or Firm—Nison & Vanderhye P.C.

(57) ABSTRACT

The present invention relates to a drive unit (10) comprising a rolling means (12) intended to be infrictional engagement with a surface over which said drive unit (10) is intended to move. The drive unit (10) also comprises a first driving means (14) and a second driving means (16), co-operatively operable to provide both propulsion and steering of said drive unit (10) while eliminating slippage between said rolling means (12) and said surface. The first driving means (14) is arranged on a rotatable support means (18) rotatable about a center axis (c.a.) and is operable to rotate said rolling (12) about a roling axis. rolling means (12) is displaced a predetermined distance from said center axis (c.a.), and the second driving means (16) is operable rotate the support means (18) about said center axis (c.a.).

16 Claims, 2 Drawing Sheets

DRIVE UNIT, AND A POWERED VEHICLE

This application is the US national phase of international application PCT/SE03/00109 filed 22 Jan. 2003, which designated the US and claims priority to SE Application No. 0200201-2, filed 22 Jan. 2002. The entire contents of these applications are incorporated herein by reference.

The present invention relates in a first aspect to a drive unit.

In a second aspect the present invention relates to a powered vehicle.

DESCRIPTION OF THE RELATED ART

The theatre has automated much of the equipment used for the movement of scenery and lighting. Most of stage activity involves simply moving scenery about the stage. Automated systems for doing this have been limited by poor radio communication, lack of accuracy and navigation, high noise and high costs.

The document U.S. Pat. No. 5,823,884 discloses a powered stage wagon comprising a chassis to which there is mounted a plurality of rolling support means, each of which is located at a respective corner of the chassis. The powered stage wagon also comprises a first and a second drive means, both mounted on the chassis in engagement with the surface over which the stage wagon is to move and are mutually spaced. The two drive means both comprise a wheel which is mounted for rotation about a drive shaft. At the end of the drive shaft remote from the wheel there is provided both a gear-box and a motor, so the motor drives the drive shaft via the gear-box so as to cause a rotation of the wheel. The entire assembly comprising the wheel, the drive shaft, the gear-box and the motor is mounted on a circular support member which is itself mounted for rotation about an axis perpendicular to the drive shaft. By actuating a second motor it is possible to cause the rotation of the circular support member and thereby alter the relative orientation of the wheel with respect to the surface over which the stage wagon is to move. By actuating the first motor it is possible to control the speed with which the stage wagon moves in the direction determined by the second motor.

One main disadvantage with the stage wagon according to the document U.S. Pat. No. 5,823,884 is that it causes damage to the floor surface caused by slippage, due to rotation of the drive wheel at slow speeds or at standstill. One way of trying to eliminate this problem is the use of special floor materials or require the wagon to move in order to rotate the wheel, limiting the types of movement the wagon can make. Another way of trying to eliminate this problem is to separate the functions of locomotion and steering, limiting the types of movement the wagon can make. However, these solutions result in other problems as is clear from the statements made above.

SUMMARY OF THE INVENTION

It is an object of the present invention to solve the above mentioned problems.

According to the present invention there is provided in a first aspect a drive unit comprising a rolling means intended to be in frictional engagement with a surface over which said drive unit is intended to move. The drive unit also comprises a first driving means and a second driving means, co-operatively operable to provide both propulsion and steering of said drive unit while eliminating slippage between said rolling means and said surface. The first drive means is arranged on a rotatable support means rotatable about a center axis and operable to rotate said rolling means about a rolling axis, wherein said rolling means is displaced a predetermined distance from said center axis. The second driving means is operable to rotate said support means about said center axis. This drive unit eliminates the slippage between the rolling means and said surface. This is achieved without the use of any special floor materials or without limiting the types of movement the drive unit can make.

Another advantage with this drive unit is that it is scalable, i.e. it is adaptable to be used in small, lightweight vehicles or for vehicles carrying extremely heavy loads.

A further advantage in this context is achieved if said rolling axis is perpendicular to said center axis.

Furthermore, it is an advantage in this context if said support means on its circumference is provided with a sprocket means driven by said second driving means by way of a transmission means.

A further advantage in this context if said transmission means is a chain which is engaged with said sprocket means and a toothed wheel driven by said second driving means.

Furthermore, it is an advantage in this context if said drive unit also comprises a tension wheel which is engaged with said chain.

A further advantage in this context is achieved if said transmission means is a toothed wheel driven by said second driving means, wherein said toothed wheel is engaged with said sprocket means.

Furthermore, it is an advantage in this context if said drive unit also comprises a planetary gear-box mounted on said first driving means, and in connection with said rolling means.

A further advantage in this context is achieved if said rotatable support means is supported by a ball bearing means.

Furthermore, it is an advantage in this context if said first and second driving means, each is a servomotor.

A further advantage in this context is achieved if said rolling means is a wheel.

Furthermore, it is an advantage in this context if said support means is a round plate.

A further advantage in this context is achieved if said drive unit also comprises a rotation limiter arranged in the vicinity of said rotatable support means.

Furthermore, it is an advantage in this context if said drive unit also comprises a sensor means arranged in the vicinity of said rotatable support means, which sensor means is operable to detect the position of said rotatable support means.

Another object of the invention is to provide a powered vehicle comprising a chassis, at least three rolling means mounted on said chassis for engagement with a surface over which said vehicle is to move. At least two of said rolling means is a drive unit according to the present invention. This vehicle eliminates the slippage between said rolling means and said surface. This is achieved without the use of any special floor materials or without limiting the types of movement the vehicle can make.

Another advantage is that this powered vehicle is scalable that is, it is adaptable to be a small, lightweight vehicle or a vehicle for carrying extremely heavy loads.

Another advantage is that the vehicle comprises reusable components, which e.g. means that the drive unit easily can be moved from one vehicle to another.

A further advantage in this context is achieved if said powered vehicle comprises four rolling means, each situated at a corner of said chassis, and in that two of said four rolling means are drive units, each arranged at two diagonally arranged corners of said powered vehicle.

Furthermore, it is an advantage in the context if said powered vehicle also comprises a wireless communication means for receiving control signals from a remote computer system to control said drive units.

It should be emphasized that the term "comprise/comprising" when used in this specification is taken to specify the presence of stated features, steps or components but does not preclude the presence of one or more other features, integers, steps, components or groups thereof.

BRIEF DESCRIPTION OF THE DRAWINGS

Embodiments of the invention will now be described with a reference to the accompanying drawings, in which.

DETAILED DESCRIPTION OF EMBODIMENTS

Figure 1:
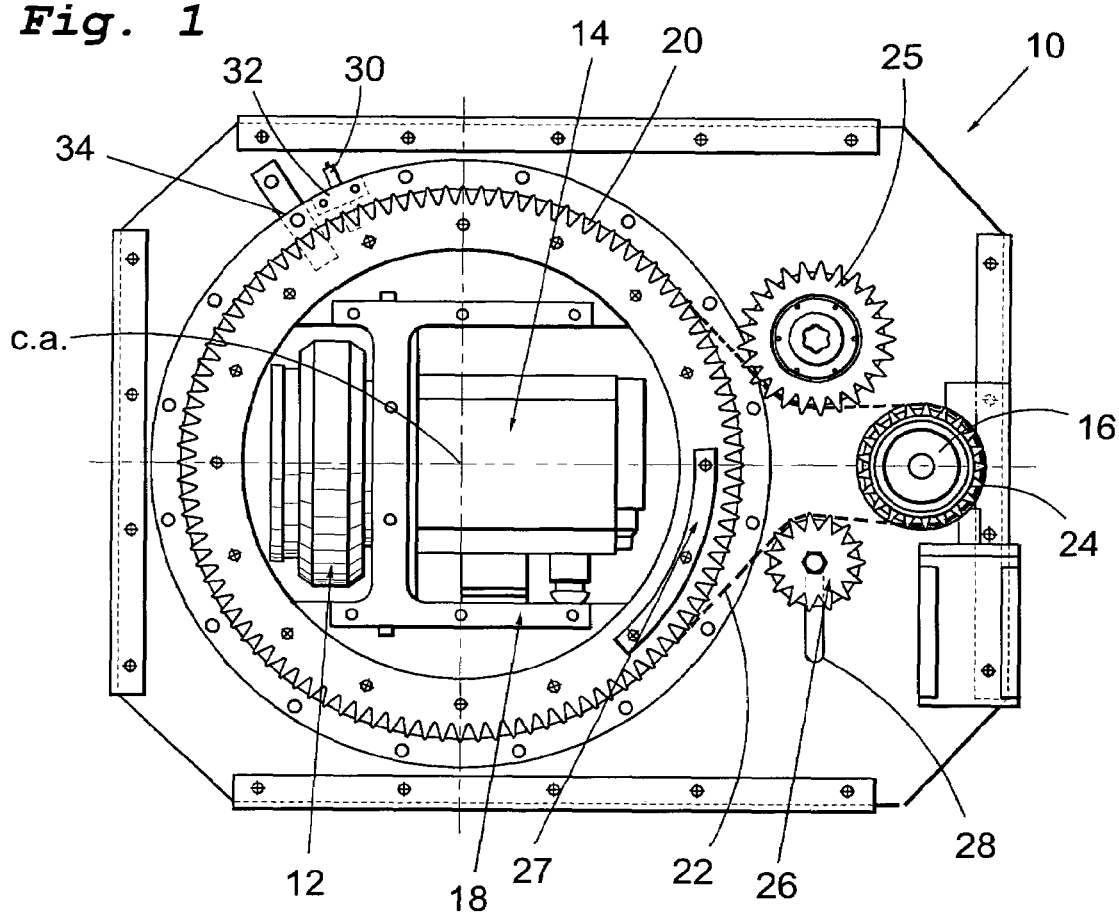
FIG. 1 shows a side view from above of a drive unit according to the present invention.

FIG. 1 shows a side view from above of a drive unit 10 according to the present invention. The drive unit 10 comprises a rolling means 12 intended to be in frictional engagement with a surface (see FIG. 2) over which said drive unit 10 is intended to move. Preferably, said rolling means 12 is a wheel 12. The driving unit 10 also comprises a first driving means 14, and a second driving means 16, co-operatively operable to provide both propulsion and steering of said drive unit 10. The first driving means 14 is arranged on a rotatable support means 18 rotatable about a center axis, c.a. The first driving means 14 is operable to rotate said rolling means 12 about a rolling axis (see FIG. 2). The rolling axis is perpendicular to said center axis, c.a. As is apparent from FIG. 1, the rolling means 12 is displaced a predetermined distance from the center axis, c.a. The second driving means 16 is operable to rotate the support means 18 about said center axis, c.a. In one preferred embodiment of the drive unit 10, which is disclosed in FIG. 1, the first and second driving means 14, 16, each is a servomotor 14, 16. The drive unit 10 also comprises a sprocket means 20 provided on the circumference of the support means 18. The sprocket means 20 is driven by the second driving means 16 by way of a transmission means. In the embodiment disclosed in FIG. 1, the transmission means is a chain 22 which is engaged with said sprocket means 20 and a toothed wheel 24 driven by said second driving means 16. The drive unit 10 disclosed in FIG. 1 also comprises a tension wheel 26 which can be in engagement with the chain 22. The tension wheel 26 can be moved along a groove 28 so as to alter the tension on the chain 22. The drive unit 10 also comprises an inductive sensor 30 arranged in a sensor holder 32 to detect the position of the sprocket means 20, i.e. the orientation of the wheel 12. The drive unit 10 also comprises a rotation limiter 34 arranged in the vicinity of the sprocket means 20.

The rotation limiter 34 sets a mechanical limit to the rotation of the drive unit 10. The drive unit 10 can also be operated manually, in which case some cables are needed for each drive unit 10. The rotation limiter 34 prevents the cables needed for the drive unit 10 from being damaged under manual operation,. In FIG. 1 there is also disclosed a stop bar and transmitting sensor 27 which functions in combination with the inductive sensor 30.

Preferably, the drive unit 10 also comprises a planetary gear-box (not disclosed) mounted on the first driving means 14, and in connection with the wheel 12. The rotatable support means 18 is supported by a ball bearing means (not disclosed). The support means 18 is preferably a plate 18.

Figure 2:
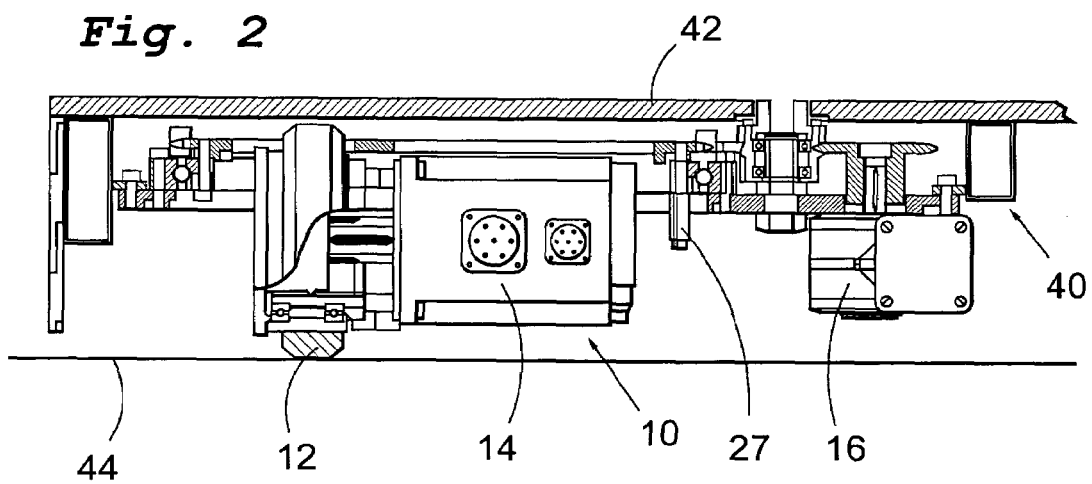
FIG. 2 shows a side view, partly in cross section, of a drive unit according to FIG. 1, mounted on a vehicle.
Figure 3:
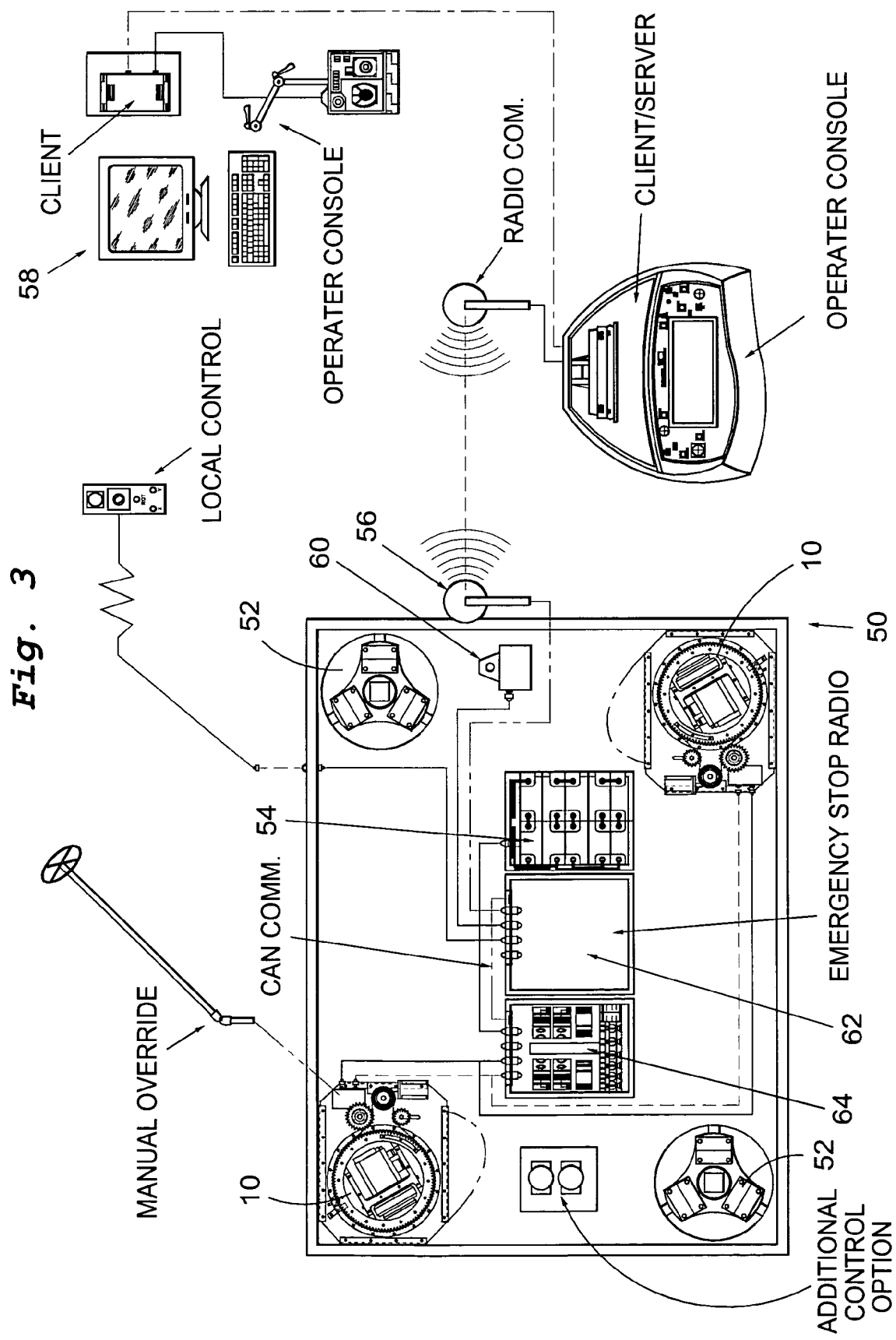
FIG. 3 shows a schematic diagram of a powered vehicle according to the present invention.

In FIG. 2 there is disclosed a side view, partly in cross section, of a drive unit 10 according to FIG. 1, mounted on a vehicle (see FIG. 3). The same elements disclosed both in FIGS. 1 and 2 are designated with the same reference signs. The only parts of the vehicle (see FIG. 3), which partly is disclosed in FIG. 2, is the vehicle frame 40 and the top plate 42 of the vehicle. In FIG. 2 there is also disclosed the surface 44 over which said drive unit 10 is intended to move. In FIG. 2 there is also disclosed another advantage with the drive unit 10, i.e. the relative placement of the servomotors 14, 16 allows the drive unit 10 to be of a low height-limited only by the diameter of the first servomotor 14 plus suitable clearances.

This imply another advantage with the present invention, i.e. the combination of low height and servomotors with high power give rise to both low height and high loading capacity.

The drive unit 10 uses two motors 14, 16 that, in combination, provide propulsion and steerage. The first motor 14 is mounted on a plate 18 supported by a ball bearing means. The plate 18 and the first motor 14 can therefore rotate with respect to the drive unit 10, or a vehicle (see FIG. 3). A planetary gear-box is mounted on the first motor 14 and a wheel 12 on the gear-box, in such a way that the wheel is offset to and at a right angle to the plates' 18 center of rotation, c.a.

A second motor 16 is placed on the fixed portion of the drive unit 10 and can control the position of the rotating plate 18 by means of the chains 22. The motion of the two motors can be controlled by a data system (see FIG. 3) such that rotation of a part of the drive unit 10 and movement of the wheel 12 in combination provides propulsion at any angel to the drive unit 10, or a vehicle.

The resulting drive unit 10 has a number of advantages. It can be used for steering without excess sliding against and resulting damage to the underlying floor surface 44. It can be rotated while the vehicle is at standstill, allowing the first movement of the vehicle to be in any direction. Preferably, the wheel is offset to the center of rotation by 100 mm.

The offset of the wheel 12 will be related to the size of the drive unit 10 and the diameter of the wheel 12. The drive unit 10 disclosed in FIGS. 1 and 2 has a wheel diameter of 180 mm, and the offset is 100 mm.

Another advantage with the drive unit 10 is that the wheel 12 can be placed close to the corner of a vehicle, to allow for a large wheelbase and therefore higher stability and accuracy.

Another advantage is that the drive system is scalable, that is, it is adaptable to be used in small, lightweight vehicles or for vehicles carrying extremely heavy loads.

In FIG. 3 there is disclosed a schematic diagram of a powered vehicle 50 according to the present invention. This vehicle 50 comprises two drive units 10, of the same kind disclosed in FIG. 1, and two passive rolling means 52. The two drive units 10 are arranged in two diagonally arranged corners of the vehicle and the two passive rolling means 52 are arrange in the two other corners of the vehicle. The vehicle 50 is e.g. powered by a battery pack 54. The vehicle 50 also comprises a wireless communication means 56 for communicating with a remote computer system 58 to control said drive unit 10, i.e. the movement and steering of the vehicle 50. The vehicle 50 also comprises a laser navigation unit 60, e.g. a laser scanner which makes use of several reflectors mounted along the perimeter of e.g. the stage area. The vehicle 50 also comprises a central processing unit 62 which is connected to the laser navigation unit 60, the wireless communication means 56, the battery pack 54 and a number of servo amplifiers 64 which in turn are connected to the drive units 10.

Another examples of the transmission means 22 can be a toothed gear or a belt drive. It is also possible to make use of a planetary gear, an eccentric gear or a spur gear in the dive unit 10.

It is to be noted that the invention does not only relate to a stage wagon, but to a powered vehicle which can be used in many different applications, such as robotics and in material handling.

The invention is not limited to the embodiments described in the foregoing. It will be obvious that many different modifications are possible within the scope of the following claims.

The invention claimed is:

1. A drive unit comprising a rolling means intended to be in frictional engagement with a surface over which said drive unit is intended to move, a first driving means and a second driving means, co-operatively operable to provide both propulsion and steering of said drive unit while eliminating slippage between said rolling means and said surface, wherein said first driving means is arranged on a rotatable support means rotatable about a center axis and is operable to rotate said rolling means about a rolling axis, wherein said rolling means is displaced a predetermined distance from said center axis, wherein said second driving means is operable to rotate said support means about said center axis, allowing said support means and said rolling means to rotate with respect to said drive unit.

2. The drive unit according to claim 1, wherein said rolling axis is perpendicular to said center axis.

3. The drive unit according to claim 1, wherein said support means on its circumference is provided with a sprocket means driven by said second driving means by way of a transmission means.

4. The drive unit according to claim 3, wherein said transmission means is a chain which is engaged with said sprocket means and a toothed wheel driven by said second driving means.

5. The drive unit according to claim 4, wherein said drive unit also comprises a tension wheel which is engaged with said chain.

6. The drive unit according to claim 3, wherein said transmission means is a toothed wheel driven by said second driving means, wherein said toothed wheel is engaged with said sprocket means.

7. The drive unit according to claim 1, wherein said drive unit also comprises a planetary gear-box mounted on said first driving means, and in connection with said rolling means.

8. The drive unit according to claim 1, wherein said rotatable support means is supported by a ball bearing means.

9. The drive unit according to claim 1, wherein said first and second driving means, each is a servomotor.

10. The drive unit according to claim 1, wherein said rolling means is a wheel.

11. The drive unit according to claim 1, wherein said support means is a round plate.

12. The drive unit according to claim 1, wherein said drive unit also comprises a rotation limiter arranged in the vicinity of said rotatable support means.

13. The drive unit according to claim 1, wherein said drive unit also comprises a sensor means arranged in the vicinity of said rotatable support means, which sensor means is operable to detect the position of said rotatable support means.

14. A powered vehicle comprising a chassis, at least three rolling means mounted on said chassis for engagement with a surface over which said vehicle is to move, wherein at least two of said rolling means each is the drive unit according to claim 1.

15. The powered vehicle according to claim 14, wherein said powered vehicle comprises four rolling means, each situated at a corner of said chassis, and in that two of said four rolling means are drive units, each arranged at two diagonally arranged corners of said powered vehicle.

16. The powered vehicle according to claim 14, wherein said powered vehicle also comprises a wireless communication means for receiving control signals from a remote computer system to control said drive units.

* * * * *